(12) United States Patent
Brunner

(10) Patent No.: US 7,837,574 B2
(45) Date of Patent: Nov. 23, 2010

(54) POSITION DETERMINATION SYSTEM AND BALL SPORT TRAINING SYSTEM

(75) Inventor: Wolfgang Brunner, Maierhöfen (DE)

(73) Assignee: Zebris Medical GmbH (DE)

( * ) Notice: Subject to any disclaimer, the term of this patent is extended or adjusted under 35 U.S.C. 154(b) by 1124 days.

(21) Appl. No.: 11/281,105

(22) Filed: Nov. 16, 2005

(65) Prior Publication Data

US 2006/0105849 A1 May 18, 2006

(30) Foreign Application Priority Data

Nov. 17, 2004 (DE) ............... 10 2004 055 489
Nov. 17, 2004 (DE) ............... 10 2004 055 490

(51) Int. Cl.
*A63B 57/00* (2006.01)

(52) U.S. Cl. ............... 473/223; 473/131; 473/151; 473/221; 473/222; 473/226

(58) Field of Classification Search ............... 473/131, 473/134, 151, 152, 198, 199, 200, 219, 221, 473/222, 223, 226, 231, 232, 233
See application file for complete search history.

(56) References Cited

U.S. PATENT DOCUMENTS

| | | | | |
|---|---|---|---|---|
| 4,542,906 A | * | 9/1985 | Takase et al. | ............... 473/152 |
| 4,939,701 A | | 7/1990 | Brunner | |
| 5,227,985 A | * | 7/1993 | DeMenthon | ............... 702/153 |
| 6,416,327 B1 | * | 7/2002 | Wittenbecher | ............... 434/247 |
| 6,459,242 B1 | * | 10/2002 | Bures et al. | ............... 320/132 |
| 2005/0215335 A1 | * | 9/2005 | Marquardt | ............... 473/131 |
| 2005/0215340 A1 | * | 9/2005 | Stites et al. | ............... 473/233 |
| 2006/0082546 A1 | * | 4/2006 | Wey | ............... 345/156 |
| 2006/0287117 A1 | * | 12/2006 | Dilz et al. | ............... 473/131 |
| 2008/0098797 A1 | * | 5/2008 | Considine et al. | ............... 73/12.09 |

FOREIGN PATENT DOCUMENTS

| | | |
|---|---|---|
| DE | 19946798 | 9/2000 |
| DE | 10 2004 055 489.7 | 5/2006 |
| DE | 10 2004 055 490.0 | 7/2006 |
| EP | 0305780 | 3/1989 |
| WO | WO 99/49944 | 10/1999 |

* cited by examiner

*Primary Examiner*—James S McClellan
(74) *Attorney, Agent, or Firm*—Donald R. Boys; Central Coast Patent Agency, Inc.

(57) ABSTRACT

Position measuring system including a synchronization transducer used to synchronize a position signal evaluation with the position signal emission of a wireless synchronization transmission line between a position signal transmitter and a position signal evaluation unit, or visa versa, in order to transmit synchronization signals to a series controller of a position signal transmitter or to identifying means of the position signal evaluation unit.

9 Claims, 1 Drawing Sheet

POSITION DETERMINATION SYSTEM AND BALL SPORT TRAINING SYSTEM

BACKGROUND OF THE INVENTION

1. Field of the Invention

Figure 1:
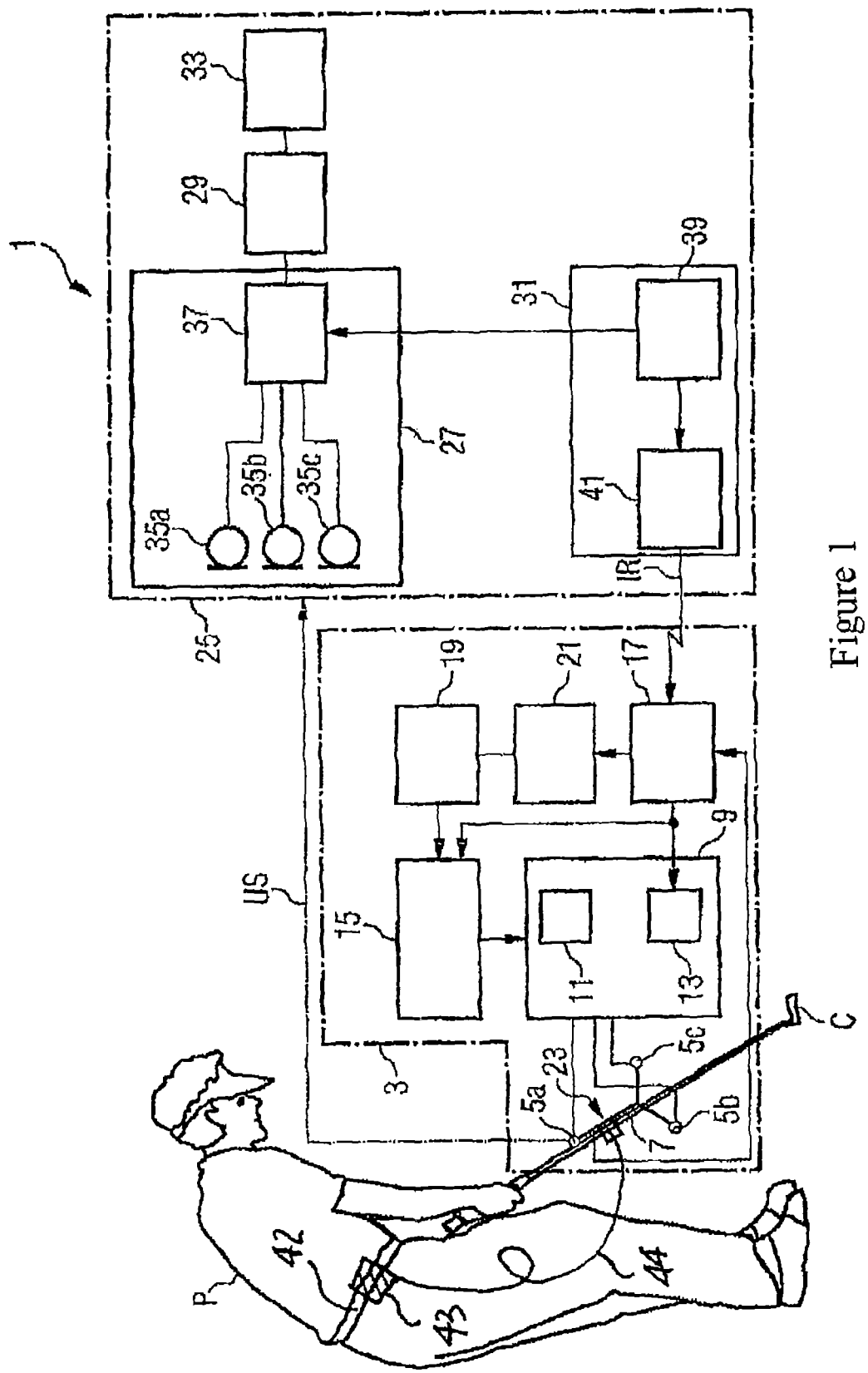

The invention relates to a position measuring system in general, which allows the tracking of a fast changing position of an object and therewith allows the tracking, and ultimately the display of the path of movement.

2. Description of the State of the Art

There are many position measuring systems in general, but there remain problems and unmet needs. The present invention provides novel improvements to the art.

SUMMARY OF THE INVENTION

A position measuring system to dynamically determine the position of an object during movement is provided, comprising a position signal transmitter that is attachable to the object and that includes a plurality of transmitter elements that are controlled by a series controller with a predetermined transmitter time program in order to emit an ordered quantity of position signals, a position signal receiver for the reception of the position signals, that is stationary to said position signal transmitter and that has a wireless connection to said position signal transmitter, a position signal evaluation unit, connected downstream from said position signal receiver, used to evaluate said position signals for the dynamic determination of the object's position during movement, whereas said position signal evaluation unit includes identifying means to identify the respective position signals of the ordered quantity due to said transmitter time program, that are emitted by certain transmitter elements of said position signal transmitter, a synchronization transducer used to synchronize the position signal evaluation with the position signal emission and a wireless synchronization signal transmission line between said position signal transmitter and said position signal evaluation unit, or visa versa, to transmit synchronization signals to said series controller of said position signal transmitter or to said identifying means of said position signal evaluation unit, whereas said synchronization transducer is assigned to said position signal evaluation unit, and wherein said series controller of said position signal transmitter includes an internal timer that is triggered by a temporary reception of a synchronization signal from said synchronization transducer and that internally controls said transmitter time program in case of further non-existing external synchronization signals.

BRIEF DESCRIPTION OF THE DRAWING FIGURES

FIG. 1 is an architectural overview of a position determination system and ball sport training system of the present invention.

DESCRIPTION OF THE PREFERRED EMBODIMENTS

The invention includes in particular a ball sport training system, a so called putting trainer for the golf sport, with which a player can practice his handling skills of the club, racket or stick, respectively that is used to exercise the ball sport.

Such systems are, for example, known from areas where industrial robot controllers are used. They are characterized by wireless operating readings recorders that send position data to an acquisition and analysis device, where the readings—possibly in the course of comparative processing with stored data for comparison—are processed according to a predetermined algorithm. A display device that is coupled with the analysis device displays the successional output of the measurement results, for example as graphical illustration of the object's path of movement.

Regarding the functional principle of the data acquisition and processing, in particular with an ultrasonic data acquisition, reference is made to the documents U.S. Pat. No. 4,939,701 and EP 0 305 780 B1, which include previous work of the inventor. The documents already show a potential method for reducing errors by means of ultrasonic signals and, in particular, teach synchronization of the transmission of the ultrasonic signals necessary for the data acquisition, with additional pulsed light or infrared (IR) signals. Systems that operate according to the principles described herein are supplied by the company zebris Medical GmbH, D 88316 Isny, Germany.

A specific training system is described in WO 99/49944. Also, DE 199 46 798 A1 describes a method and device with similar objectives, such as analysis of the movement pattern of the thoracolumbar section of the human vertebral column during a golf swing.

Systems and methods in embodiments of the invention specifically include wireless operating data recorders, attached to the club, racket or stick, respectively, used to practice the ball sport and/or to the players body, transmitting position data to an acquisition and evaluation device, where the readings—possibly in the course of comparative processing with stored data for comparison—are processed according to a predetermined algorithm. The measurement results are displayed in succession on a display device that is coupled with an evaluation device allowing a conclusion of the quality of the movement, thus providing certain errors and possible improvement opportunities to the player or his coach.

Therefore, an object of the present invention is to provide a position measuring system or training system that operates nearly interference-free and, at the same time, is built in a simple manner and is easy to handle.

One important aspect of the invention is to attach a position signal transmitter comprising a plurality of transmitter elements to the object (club, racket or stick, respectively) to be tracked, and said transmitter elements are controlled by a series controller according to a predetermined transmission time program in order to transmit an ordered quantity of position signals. In addition, a position signal receiver, stationary relative to the position signal transmitter during operation and linked via a wireless connection, is used to receive position signals. Finally, an evaluating unit, used to evaluate the position signal to dynamically determine the object's position, is coupled downstream to the receiver.

In the suggested training system, a display unit used to display the data representing the movement of the club, racket or stick, respectively, in particular in the form of a graphic illustration of the movement, is connected downstream from the evaluation unit.

The position signal transmitter may be designed as one piece that is incorporated in a housing, attachable to the respective object and also containing non-rechargeable or rechargeable batteries used for power supply. A particular emphasis lies in miniaturization of the electronic design and the application of high performance miniature rechargeable or non-rechargeable batteries to maintain compact dimensions and low weight, in order to minimize falsification of the object's mechanical properties. Needless to say that this will increase the costs, hence, at the present time the embodiment is considered as a high end variation.

Alternatively, a two piece embodiment is also possible, such that a basic element that comprises the actual transmitter elements is attached to the object and connected via a short cable to a basic device that comprises the power supply and a majority of the electronic components. Here, bulkier and heavier non-rechargeable or rechargeable batteries are applicable, and no particular emphasis has to be made to the miniaturization of the electronic circuits. This embodiment may represent a low-cost variation.

Another important aspect of the invention is that the position signal evaluation unit comprises identifying means in order to identify the position signals transmitted by certain transmitter elements of the transmitter due to the transmitter time program. In the context of this identification, a synchronization transducer is further provided to synchronize the position signal evaluation, using the position signal emission and a wireless synchronization signal transmission line between the position signal transmitter and the position signal—evaluation unit (or visa versa), in order to transmit synchronization signals to the series—controller of the transmitter or the identifying means of the evaluation unit. Through this, an ordered acquisition and identification of the received signals is realized according to the timing of the transmitter signals of each individual transmitter element.

Another important aspect of the invention includes the assignment of a synchronization transducer to the position signal evaluation unit and that the series controller of the position signal transmitter has an internal timer, which is triggered by the temporary reception of a synchronization signal from the synchronization transmitter, and controls the transmitter time program internally in case of further non-existing external synchronization signals.

Through this, it is ensured that even with (not too long lasting) interferences during the transmission of the synchronization signal, a once started position acquisition and evaluation process may be continued with sufficient accuracy and a viable result of the evaluation may be provided. Thus the overall acceptability of the system is increased and its prospects on the market are improved.

In one embodiment of the invention, where a user or a player are provided with relevant information of the operating state, the position signal transmitter or alternatively, the stationary measurement device (the position signal receiver/evaluation unit) comprise display elements for displaying the operating mode. Said display elements may comprise in particular a standby display, a measurement mode display and a synchronization interruption display, and may be realized as easy to detect and inexpensive, multicolored and/or differently flashing LEDs.

A preferred embodiment of the invention includes assignment of the synchronization transducer to the position signal evaluation unit, and that the series controller of the position signal transmitter comprises an internal timer that is triggered by a temporary reception of a synchronization signal from the synchronization transducer and that controls the transmitter time program internally, in the case of further non-existing external synchronization signals.

Through this, it is ensured that even with (not too long lasting) interferences during the transmission of the synchronization signal, a once started position acquisition and evaluation process may be continued with sufficient accuracy and a viable result of the evaluation may be provided to the player. Thus the overall acceptability of the ball sport training system is increased and its prospects on the market are improved.

Alternatively to this, it is included that the synchronization transducer is assigned to the position signal transmitter, and that the identifying means in the position signal evaluation unit are controlled via the synchronization transmission line. Here, the position signal evaluation unit may operate completely without internal time base, or it is included that the position signal evaluation unit comprises a timer that is triggered by a temporary reception of a synchronization signal from the synchronization transducer and that controls the identification process internally in the case of further non-existing external synchronization signals.

A preferred technical realization includes that the synchronization signal transmission line comprises an IR transmitter element in the position signal evaluation unit and an IR receiver element in the position signal transmitter, or vice versa.

On the other hand, the transmitter elements of the position signal transmitter may be ultrasound or IR elements with the same transmission frequency or wavelength, i.e. without a channel sub division of the frequency band. Here, the position signal receiver preferably includes a number of receiver elements, calibrated towards the transformer principle of the transmitter elements, where the operation of said receiver elements is controlled by the synchronization transducer according to the transmitter time program.

Advantages and practicalities of the invention result from the following detailed description of a simple example of an exemplary embodiment on the basis of a sole FIGURE that shows a schematic diagram in the form of a block diagram of a putting trainer 1 for the golf sport.

At this point it should be pointed out already, that the invention is not restricted to capturing the position or orientation of a golf club and the illustration of its path of movement, but is also applicable in training systems of other ball sports, for example, mini golf or cricket or even tennis and badminton. It is self evident that the respective system component of the club, racket or stick, respectively, is adapted to the actual shape of the club, racket or stick, respectively, and that the system design as a whole, is suitable for the typical movement patterns of the respective sport.

Moreover the invention also comprises position measuring systems for body movements of a living creature, e.g. applications in orthopedics or sports medicine or the like, that may be regarded as diagnostic or training systems in a broader sense. In addition, the invention also comprises improvements of the aforementioned systems for industrial robot control systems, as well as other systems that track the path of movement with short range especially, if a learning effect should be derived thereof.

The putting trainer 1 comprises a position signal transmitter 3 that is removably mounted to a golf club C that is held by a player P and that is attached to the club in a predetermined position through suitable (not illustrated) mounting and alignment means. The transmitter 3 comprises three ultrasound transmitter elements 5a, 5b and 5c that are firmly affixed to a multi ramified basic element 7. Details of the mechanical assembly of the position signal transmitter elements are not part of the present invention and, therefore, are not described any further.

The position signal transmitter 3 comprises a series controller 9 to control the sequential emission of ultrasonic signals using the individual transmitter elements 5a, 5b and 5c. The series controller 9 comprises a transmitter program memory 11 for storing a corresponding transmitter time program as well as a trigger stage 13 for triggering a transmission. Furthermore, a time control unit 15 is provided for high precision control of the temporary procedure of the signal transmission, which, in itself, is coupled with a synchronous signal receiver 17, an internal timer 19 and an idle switching stage 21.

An input of the synchronous signal receiver stage 17 is coupled to the IR receiver element 23 placed on the basic element 7 of the position signal transmitter, where said IR receiver element operates as a synchronous signal receiver in order to receive an external synchronous signal. The output of the synchronous signal receiver stage 17 is, on the one hand, connected with the input of the trigger stage 13 and, on the other hand, connected with the input of the time control unit 15. With an existing received synchronization signal, said synchronous signal receiver 17 directly controls the trigger stage 13, to start a position signal measurement procedure, as well as the time control unit 15, to directly control the temporary procedure of said position signal measurement procedure.

The idle switching stage 21 is connected with the input of said synchronous signal receiver 17 causing the internal timer 19 to take over the time control of the transmission procedure in the case of an unavailable external synchronous signal while responding.

A position signal receiver/display device 25 is positioned at some distance from the player P having the golf club C with a position signal transmission unit attached to it, including the essential components of a position signal receiver 27, a downstream connected position signal evaluation unit 29, a synchronization unit 31 and a display unit 33 connected downstream from the evaluation unit 29. The position signal receiver 27 comprises three ultrasound microphones 35a, 35b, 35c and a, inputwise connected, receiver signal processing stage 37 including identifying means (not labeled separately) implemented to identify the received ultrasound signals US via ultrasound microphones.

The operation of the receiver signal processing stage 37, as well as the algorithm used to calculate the successive positions of the golf club's movement and, finally, the operation of the display unit 33 used to display the golf club's path of movement determined from the position signal data, are known to the person skilled in the art of other applications of wireless operating position measuring systems, for example, from industrial robotics and medicine, and therefore do not require any further description. The operating methods and algorithms of the present training system will certainly be adapted to the information needs of the player and coach, although the adaptation is not part of the present invention.

The synchronization stage 31 comprises a synchronization transducer 39 as well as an IR transmitter element 41 that is connected to the input of said synchronization transducer 39 and serves as the synchronization signal transmitter to transmit synchronization signals IR to the position signal transmitter 3.

The display unit 33 comprises (in a form generally known) a display buffer and various pre programmed control functions in order to generate different desired displays due to the processing result of the position data (and the movement patterns herefrom) of golf club C.

The synchronization transducer 39 generates a synchronous signal that is an important control signal for the entire measurement and evaluation process of the position data, and that is, on the one hand, supplied internally to be evaluation/display device 25 of the receiver signal processing stage 37 and, on the other hand, supplied to the position signal transmitter 3 via the IR transmitter element 41 and the IR receiver element 23. Hence, the signal controls, on the one hand, as mentioned above, the sequential procedure of the position signal emission via the transmitter 3 and, on the other hand, a hereupon attuned and herewith synchronous procedure of the evaluation of the ultrasound signals received via the microphones 35a, 35b and 35c.

Through this, a correct transmitter receiver signal allocation of the measurement signal transmission and, apart from that, the elimination of certain disturbances (as mentioned above, taught already in previous documents of the inventor) is ensured. The precise allocation and synchronicity of the position signal emission and evaluation is necessary for the realization of the (generally known) evaluation algorithm of the position signals that works on the basis of the triangulation principle and a following coordination transformation.

On the other hand, the automated activation of the internal timer 19 of the transmitter causes, in case of the unavailability of the synchronous signal on the synchronous signal input of the transmitter (for example due to temporary interruptions of the optical transmission line) that, nevertheless, a measurement signal transmission/evaluation process of the position signal transmitter 3, initiated through the reception of a synchronous signal, can be concluded. The internal timer 19 ensures a sufficiently precise time control of the transmission procedure for the required time period in order to ensure the synchronization with the process that is controlled internally within the receiver through the synchronization transducer 39.

A, for the system, preferred measurement procedure is as follows: at the beginning of the putting attempt, the player switches the position signal transmitter that is attached to the golf club to "stand by", whereupon the stand by modus may be indicated through, for example, a green or yellow flashing LED placed on the basic element of the transmitter.

A synchronization signal transmission line is established, as soon as the player brings the golf club, including the position signal transmitter and the thereto assigned synchronization signal receiver (IR sensor), near the stationary measurement device (the position signal receiver including the synchronization signal transmitter). With the reception of the first synchronization signal from the stationary device, the IR sensor of the golf club switches from the stand by mode into the measurement mode. The change of the operation state is again indicated expediently on a display on the golf club, for example, with a permanently glowing green LED. Once the synchronization signal transmission line is established, the position signal transmitter starts to operate and only stops, in case a synchronization signal (IR signal) has not been received for a longer definitive time (for example 30 seconds). During short interruptions of the synchronization signal transmission line, the internal timer controls the transmission operation independently. Such an interruption may be indicated to the player, for example, through a (compared to the aforementioned LED) different colored or different flashing LED.

From the above mentioned, it is understood that a comparable procedure may also be possible with an inverse arrangement of the synchronization signal transmitter and receiver. In this case, the mentioned display may also, for logical reason, take place on the stationary measurement device.

Embodiments of the invention are not limited to this example, but also include a plurality of variations, that lie in the scope of competent acting. For example, it was described above that the signal transmitter might be in two parts. A first part night have the basic elements of the transmitter attached to the object and connected via a short cable 44 to a basic device 43 attached, for example to a user's belt 42, that comprises the power supply and a majority of the electronic components. Here, bulkier and heavier non-rechargeable or rechargeable batteries are applicable, and no particular emphasis has to be made to the miniaturization of the electronic circuits. This embodiment may represent a low-cost variation. Thus, inversions of the embodiment/allocation between active and passive elements of the signal transmission procedures in particular, lie in the scope of the invention, as well as diverting realizations of both important signal transmission procedures according to other, generally known physical principles. This is also valid for every combination of characterizing features of the preferred embodiments described above. Finally, the invention also comprises methods that are distinguished through the aspects of the invention explained above—in particular through the explained sequence of a measurement procedure.

The invention claimed is:

1. A ball sport training system to dynamically determine the position of an object during movement, comprising:
    a position signal transmitter attached to the object including an active ultrasonic transmitter element and an infrared (IR) transmitter element, each with the same transmitter frequency or wavelength and transmitting without channel separation, controlled by a series controller with a predetermined transmitter time program in order to emit an ordered quantity of position signals;
    a position signal receiver for the reception of the position signals, that is stationary to said position signal transmitter and that has a wireless connection to said position signal transmitter;
    a position signal evaluation unit, connected downstream from said position signal receiver, evaluating said position signals from the position signal transmitter for the dynamic determination of the object's position during movement, whereas said position signal evaluation unit includes identifying means to identify the respective position signals of said transmitter time program, that are emitted by the IR and ultrasonic transmitter elements of said position signal transmitter;
    a synchronization transducer synchronizing the position signal evaluation with the position signal emission by using a wireless synchronization signal transmission line, external to the ultrasonic and IR sensor signal transmissions, between said position signal transmitter and said position signal evaluation unit to transmit synchronization signals to said series controller of said position signal transmitter or to said identifying means of said position signal evaluation unit, whereas said synchronization transducer is assigned to said position signal evaluation unit; and
    wherein said series controller of said position signal transmitter includes an internal timer that is triggered by a temporary reception of an internal synchronization signal from said synchronization transducer and that internally controls said transmitter time program in case of further non-existing external synchronization signals.

2. Ball sport training system according to claim 1 characterized by;
    a two-piece position signal transmitter, wherein a part is attached to the object and coupled to a second, spatially displaced part, via a signal and power supply cable comprising a power supply as well as electronic circuits of said position signal transmitter.

3. Ball sport training system according to claim 1 characterized by;
    a position signal transmitter or position signal receiver including display elements for displaying the operation state by triggering multicolored flash-operation controlled LEDs that are triggered depending on the state of the operation of the synchronization signal transmission line.

4. Ball sport training system, comprising:
    a position signal transmitter that is attached to a club, racket or stick used to practice the ball sport including an active ultrasonic transmitter element and an infrared (IR) transmitter element, each with the same transmitter frequency or wavelength and transmitting without channel separation, that are controlled by a series controller with a predetermined transmitter time program emitting an ordered quantity of position signals;
    a position signal receiver receiving position signals that are stationary to said position signal transmitter including a wireless connection to said position signal transmitter;
    a position signal evaluation unit connected downstream to said position signal receiver evaluating said position signals from the position signal transmitter for the dynamic determination of the position of the club, racket or stick during movement, whereas said position signal evaluation unit includes identifying means to identify the respective position signals of the ordered quantity of said transmitter time program that are emitted by the IR and ultrasonic transmitter elements of said position signal transmitter;
    a synchronization transducer synchronizing the position signal evaluation with the position signal emission by using a wireless synchronization signal transmission line, external to the ultrasonic and IR sensor signal transmissions, between said position signal transmitter and said position signal evaluation unit transmitting synchronization signals to said series controller of said position signal transmitter or internally to said identifying means of said position signal evaluation unit; and
    a movement display unit, coupled to the input of said position signal evaluation unit, displaying data representing the movement of the club, racket or stick in a form of a graphical illustration of the movement.

5. Ball sport training system according to claim 4 characterized by;
    a synchronization transducer assigned to the position signal evaluation unit and a series controller of the position signal transmitter including an internal timer that is triggered by a temporary reception of a synchronization signal from said synchronization transducer and that internally controls the transmitter time program in case of further non-existing external synchronization signals.

6. Ball sport training system according to claim 4 characterized by;
    a synchronization transducer assigned to the position signal transmitter, controlling the identifying means of the position signal evaluation unit via the synchronization transmission line.

7. Ball sport training system according to claim 4 characterized by;
    a position signal evaluation unit including an internal timer that is triggered by a temporary reception of a synchronization signal from the synchronization transducer and that internally controls the identification procedure in case of further non-existing external synchronization s signals.

8. Ball sport training system according to claim 4 characterized by;
    a two-piece position signal transmitter wherein a first part is attachable to the club, racket or stick and coupled to a second part attached to a belt, via a signal and power supply cable comprising a power supply as well as electronic circuits of said position signal transmitter.

9. Ball sport training system according to claim 4 characterized by a position signal transmitter or position signal receiver including display elements for displaying the operation state with different flash-operation controlled LEDs, that are triggered depending on the state of the operation of the synchronization signal transmission line.

* * * * *